United States Patent
Ye et al.

(10) Patent No.: US 10,148,603 B2
(45) Date of Patent: Dec. 4, 2018

(54) METHODS AND SYSTEMS FOR GENERATING ELECTRONIC MESSAGES BASED UPON DYNAMIC CONTENT

(71) Applicant: salesforce.com, inc., San Francisco, CA (US)

(72) Inventors: Alex Ye, San Francisco, CA (US); Fang Wong, Fremont, CA (US); Pallavi Savla, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 436 days.

(21) Appl. No.: 13/937,895

(22) Filed: Jul. 9, 2013

(65) Prior Publication Data
US 2014/0019564 A1 Jan. 16, 2014

Related U.S. Application Data

(60) Provisional application No. 61/670,700, filed on Jul. 12, 2012.

(51) Int. Cl.
*H04L 12/58* (2006.01)

(52) U.S. Cl.
CPC ............ *H04L 51/06* (2013.01); *H04L 51/066* (2013.01)

(58) Field of Classification Search
CPC ........................................................ H04L 51/06
USPC ......................................................... 709/206
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

U.S. Appl. No. 13/986,251, filed Apr. 16, 2013.

*Primary Examiner* — Vivek Srivastava
*Assistant Examiner* — Sibte Bukhari
(74) *Attorney, Agent, or Firm* — Dergosits & Noah LLP; Todd A. Noah

(57) ABSTRACT

Systems and methods are provided for dynamic electronic message content. A first template is associated with a first electronic message service provider, and a second template is associated with a second electronic message service provider. The first template is incompatible with the second electronic message service provider and/or the second template is incompatible with the first electronic message service provider. Dynamic content for electronic messages is stored in a database accessible by the first electronic message service provider and the second electronic message service provider. The dynamic content includes electronic message addresses associated with intended recipients of the electronic messages. The first electronic message service provider is instructed to generate a set of electronic messages based on the dynamic content, wherein the first electronic message service provider uses the first template to generate the set of electronic messages.

16 Claims, 4 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0095333 A1* | 4/2008 | Tudor .................. H04L 51/28 379/88.17 |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2011/0208822 A1* | 8/2011 | Rathod ........................ 709/206 |
| 2012/0069131 A1* | 3/2012 | Abelow ....................... 348/14.01 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

* cited by examiner

METHODS AND SYSTEMS FOR GENERATING ELECTRONIC MESSAGES BASED UPON DYNAMIC CONTENT

CLAIM OF PRIORITY

This application claims the benefit of U.S. Provisional Patent Application 61/670,700 entitled METHODS AND SYSTEMS FOR DYNAMIC EMAIL MESSAGE ATTRIBUTES, by Alex Ye, et al., filed Jul. 12, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

One or more implementations relate generally to methods and systems for generating electronic messages based on dynamic content.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Electronic message service providers enable various forms of one-to-many communication, including text messages, such as provided by Verizon Wireless®, social network messages, such as provided by Twitter®, and electronic mail or email, such as provided by Gmail®. Electronic message service providers offer bulk electronic message services and/or electronic message marketing. For an example, an electronic message service provider can upload a subscriber list from a user for distributing electronic messages, and update the subscriber list to suppress those subscribers requesting to be unsubscribed. An electronic message service provider may also dynamically customize the content of electronic messages that are sent out, to tailor personalized and relevant communications. Further, an electronic message service provider may create templates for sending electronic messages to contacts and/or offer the use of pre-made templates. Additionally, an electronic message service provider may test templates for compatibility with electronic message clients, such as spam testing to gauge the score of an electronic message against known factors that will place the template at risk of being blocked. An electronic message service provider may track information showing the status of electronic messages sent to each member of an address list, and offer statistical reviews of responses to each electronic message sent to measure the success rate of a bulk electronic message distribution.

The level of service provided can be according to the above basic features, or the number of subscribers uploaded, or the frequency of use, or any combination of the above criteria. Many electronic message service providers have the same basic features and functionality, but they vary greatly in volumes, policies, and deliverability, making the selection of an appropriate electronic message service provider critical to both the success of electronic message distribution and the cost effectiveness of its implementation.

As an example, a software company may send emails to customers who began registering on-line with the software company to enable the customers to complete the registration process. The software company may send first email content, which includes users' email addresses, users' first names, a hyperlink to a registration completion webpage, and a first email template, to a first email service provider, which generates emails based on the email content. The software company may also send second email content, which includes users' email addresses and users' first names, a hyperlink to a registration completion webpage and a second email template to a second email service provider, which generates emails based on the email content.

In an embodiment, if the software company sends the first email content to the second email service provider, the second email service provider may not be able to process the first email content properly because the first email content is based on a first email template that is incompatible with the email content processed by the second email service provider. Likewise, if the software company sends the second email content to the first email service provider, the first email service provider may not be able to process the second email content properly because the second email content is based on a second email template that is incompatible with the email content processed by the first email service provider. In this example, the software company may generate code to send 40% of its registration completion emails through the first email service provider, and generate code to send the remaining 60% of its registration completion emails through the second email service provider. If the software company experiences a service outage with the second email service provider, the software company cannot send the remaining 60% of its registration completion emails through the first email service provider because the remaining 60% of its registration completion emails include a second email template that is incompatible with the email content processed by the first email service provider. Consequently, the software company must either wait until their service for the second email service provider returns, or go through the time-consuming process of regenerating code to send the remaining 60% of its registration completion emails through the first email service provider.

Although the foregoing example is based on registration completion emails, other types of electronic messages based on business requirements, such as text messages or social network messages for password reset messages, face similar challenges. Accordingly, it is desirable to provide techniques that enable a database system to improve the performance, efficiency, and the ease of use of electronic message service providers.

BRIEF SUMMARY

In accordance with embodiments, there are provided systems and methods for generating electronic messages based upon dynamic content. A first template is associated with a first electronic message service provider, and a second template is associated with a second electronic message service provider, wherein the first template is incompatible with the second electronic message service provider and/or the second template is incompatible with the first electronic message service provider. As an example, an email content creator may create a table that maps a first template to a first email service provider and maps a second template to a second email service provider, wherein the first template is incompatible with the second email service provider and the second template is incompatible with the first email service provider.

Dynamic content for electronic messages is stored in a database accessible by the first electronic message service provider and the second electronic message service provider, wherein the dynamic content includes electronic message addresses associated with intended recipients of the electronic messages. For example, the email content creator stores dynamic content for emails, including email addresses, in a database that is accessible by the first email service provider and the second email service provider. The first electronic message service provider is instructed to generate a set of electronic messages based on the dynamic content, wherein the first electronic message service provider uses the first template to generate the set of electronic messages. The email content creator may instruct the first email service provider to generate emails based on the dynamic content, for which the first email service provider uses the first template.

Both electronic message service providers may easily access and use the dynamic content stored in the database because the dynamic content does not include a specific template that may be incompatible with either of the electronic message service providers. For example, if the software company experiences a service outage with the first email service provider, the email content creator instructs the second email service provider to generate the remaining emails, which were originally intended for the first email service provider, based on the dynamic content, for which the second email service provider uses the second template. Embodiments of the method and system for generating electronic messages based upon dynamic content make electronic message generation an autonomous action that is independent of the available electronic message service providers because the creation of the dynamic content is separate from the generation of the electronic messages based on the dynamic content. The specification of templates for specific electronic message service providers is handled independently of the dynamic content that is created for the electronic messages. The generation of electronic messages becomes more reliable and scalable because this generation is no longer dependent upon any particular electronic message service provider.

While one or more implementations and techniques are described with reference to an embodiment in which dynamic electronic message content is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for generating electronic messages based upon dynamic content.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

The following detailed description describes methods and systems for generating electronic messages based on dynamic content. These systems and methods will be described with reference to example embodiments.

Figure 1:
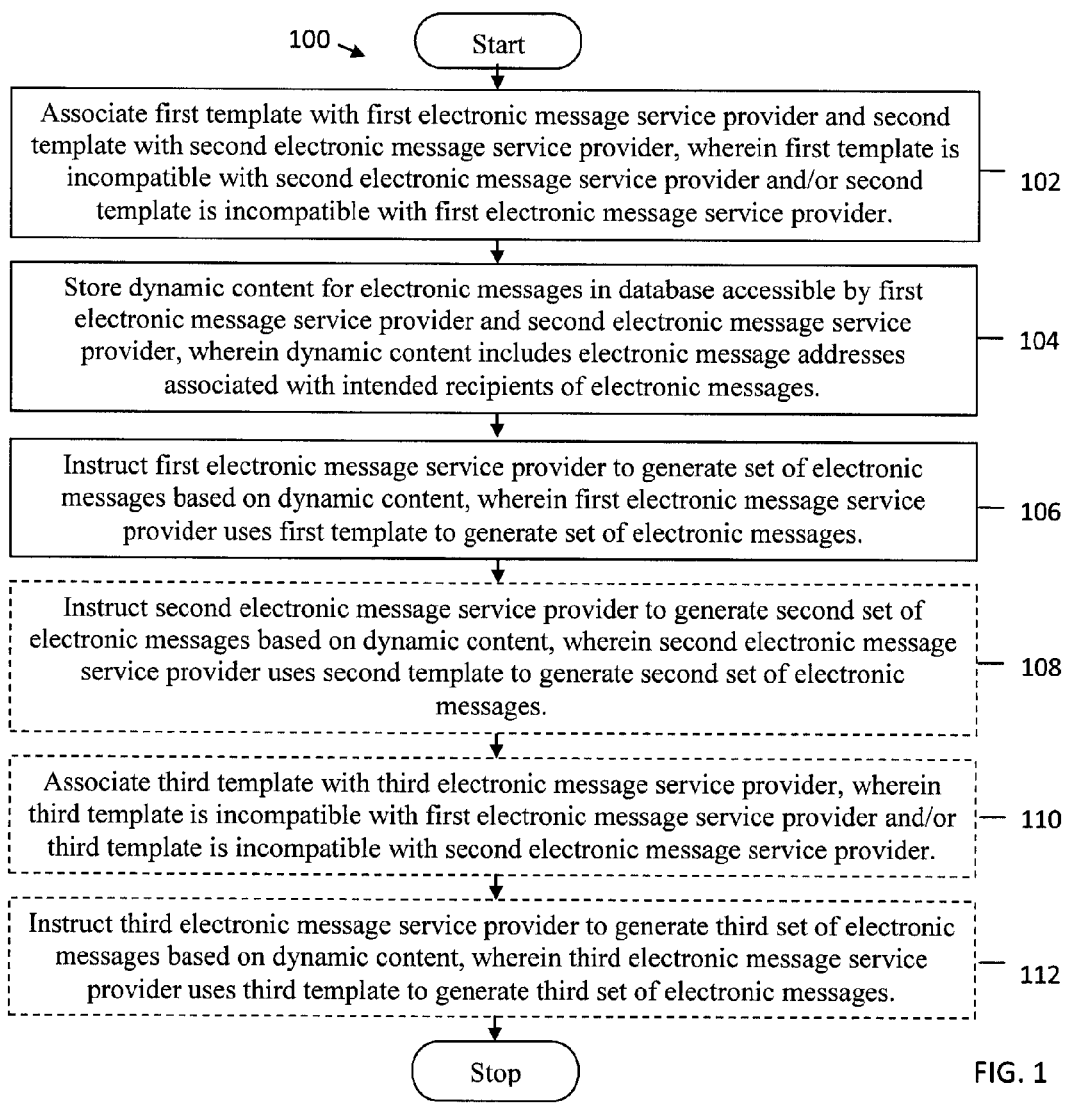
FIG. 1 is an operational flow diagram illustrating a high level overview of a method for dynamic electronic message content in an embodiment.

FIG. 1 is an operational flow diagram illustrating a high level overview of an embodiment of a method 100 for generating electronic messages based upon dynamic content. As shown in FIG. 1, electronic messages may be generated based on dynamic content. In block 102, a first template is associated with a first electronic message service provider, and a second template is associated with a second electronic message service provider, wherein the first template is incompatible with the second electronic message service provider and/or the second template is incompatible with the first electronic message service provider. One skilled in the art would understand that this can include an email content creator creating a table that maps a first email service provider to a first template and maps a second email service provider to a second template.

As explained above, the first template is incompatible with the second email service provider and/or the second template is incompatible with the first email service provider. For example, a software company may send first email content, which includes users' email addresses, users' first names, a hyperlink to a registration completion webpage, and a first email template, to a first email service provider, which generates emails based on the email content. The first email template includes "Dear (blank), Welcome to the site, please click here to continue your experience," where the first email service provider substitutes a user's first name for the "(blank)" and links the hyperlink to "here." The software company may also send second email content, which includes users' email addresses, users' first names, a hyperlink to a registration completion webpage, and a second email template, to a second email service provider, which generates emails based on the email content. The second email template may include "Dear (blank), Click here to continue your experience," where the second email service provider substitutes a user's first name for the "(blank)" and replaces "here" with its own tracking redirect to the hyperlink. This enables reporting of selection of the redirect to the hyperlink, such as used for email statistics.

If the software company sends the first email content to the second email service provider, the second email service provider may not be able to process the first email content properly because the first email content is based on a first email template that is incompatible with the email content processed by the second email service provider. The second email service provider expects to identify a template location for inserting its own tracking redirect to the hyperlink, but the first template does not provide for such an insertion. Likewise, if the software company sends the second email content to the first email service provider, the first email service provider may not be able to process the second email content properly because the second email content is based on a second email template that is incompatible with the email content processed by the first email service provider. The first email service provider expects to identify a template location for inserting the hyperlink, but the second template provides for an insertion of a tracking redirect to the hyperlink.

In block 104 of FIG. 1, dynamic content for electronic messages is stored in a database accessible by a first electronic message service provider and a second electronic message service provider, wherein the dynamic content includes electronic message addresses associated with intended recipients of the electronic messages. By way of example and without limitation, this can include the email content creator storing dynamic content for emails, including email addresses, in a database accessible by the available email service providers. Any additional dynamic content to be included in electronic messages that is not currently included in electronic messages may be simply added to the database, such as by introducing a new row in a table that specifies the dynamic content. All of the available electronic message service providers may easily access and use the dynamic content stored in the database because the dynamic content does not include a specific template that may be incompatible with any of the available electronic message service providers.

In block 106, a first electronic message service provider is instructed to generate a set of electronic messages based on the dynamic content, wherein the first electronic message service provider uses the first template to generate the set of electronic messages. In embodiments, this can include the email content creator instructing the first email service provider to generate the first 49 emails based on the dynamic content, for which the first email service provider uses the first template referenced in the mapping table for email service providers.

In block 108, a second electronic message service provider may optionally be instructed to generate a second set of electronic messages based on dynamic content, wherein the second electronic message service provider uses a second template to generate the second set of electronic messages. For example and without limitation, this can include the email content creator instructing a second email service provider to generate the remaining emails based on dynamic content, wherein the second email service provider uses a second template referenced in the mapping table for email service providers. The first electronic message service provider and the second electronic message service provider may generate electronic messages concurrently, or the second electronic message service provider may generate electronic messages after the first electronic message service provider is finished generating electronic messages.

A system user may access the electronic message content creator via a user interface to distribute which electronic messages are in the first set of electronic messages and which remaining electronic messages are in the second set of electronic messages. The distribution may be made either prior to instructing the first electronic message service provider to generate the first set of electronic messages or dynamically after instructing the first electronic message service provider to generate the first set of electronic messages. For example, the email content creator instructs the first email service provider to generate the first 49 emails in a day and instructs the second email service provider to generate the remaining emails in a day because the first email service provider charges an additional fee for generating 50 or more emails in a day whereas the second email service provider does not charge an additional fee for generating 50 or more emails in a day.

In another example, when the software company experiences a service outage with the first email service provider, the email content creator may instruct the second email service provider to generate the remaining emails, which were originally intended for the first email service provider, based on the dynamic content, for which the second email service provider uses the second template.

In block 110, a third template is associated with a third electronic message service provider, wherein the third template is incompatible with a first electronic message service provider and/or a second electronic message service provider. By way of example and without limitation, this can include the email content creator updating the mapping table to map a third template to a third email service provider because the second email service provider's statistics indicate that a disproportionally large number of email clients are blocking receipt of the redirect to the hyperlink, which is included in the second template. Whenever an electronic message service provider is to be added or subtracted from the list of available electronic message service providers, such a modification occurs simply through the addition or deletion of the electronic message service provider, and its corresponding template, to a table that lists the available electronic message service providers.

In block 112, a third electronic message service provider is instructed to generate a third set of electronic messages based on dynamic content, wherein the third electronic message service provider uses a third template to generate the third set of electronic messages. In embodiments, this can include the email content creator instructing a third email service provider to generate the remaining emails which were originally intended for the second email service provider, based on the dynamic content, for which the third email service provider uses the third template.

Because the creation of the dynamic content for electronic messages is separate from the generation of the electronic messages based on the dynamic content, electronic message generation is an autonomous action that is independent of the available electronic message service providers. Specification of templates for specific electronic message service providers are handled independently of the dynamic content that is created for the electronic messages. The generation of electronic messages becomes more reliable and scalable because this generation is no longer dependent upon any particular electronic message service provider.

The method 100 may be repeated as desired. Although this disclosure describes the blocks 102-112 executing in a particular order, one skilled in the art would understand that the blocks 102-112 may be executed in a different order.

Figure 2:
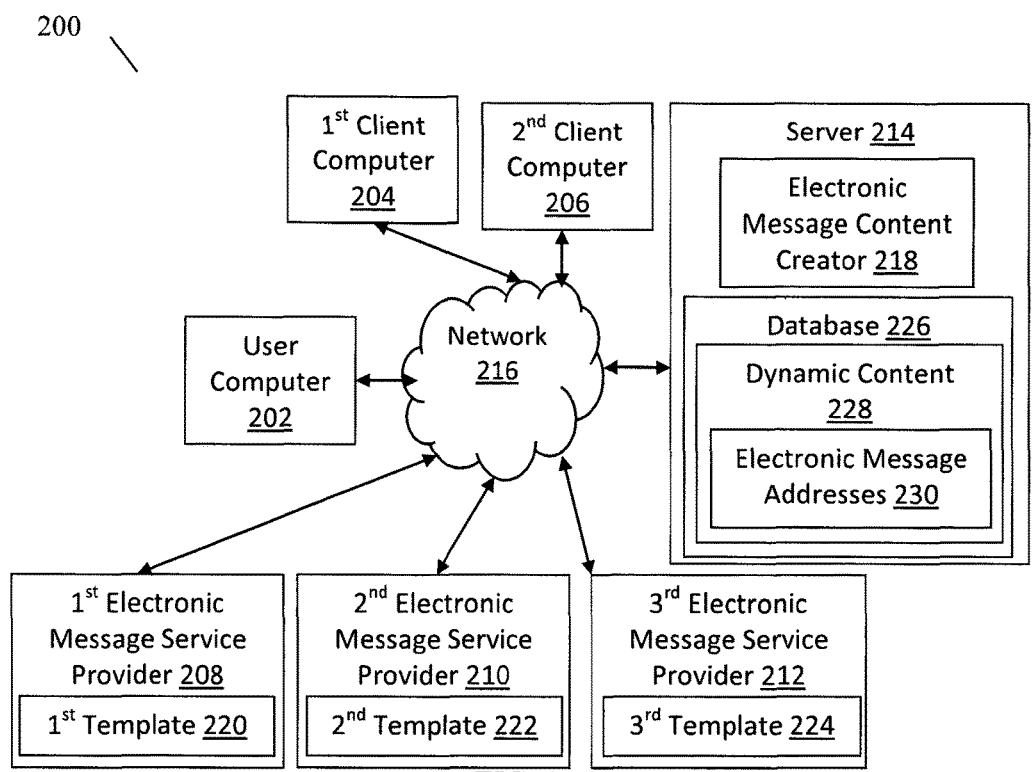
FIG. 2 illustrates a block diagram of a system for dynamic electronic message content in an embodiment.

FIG. 2 illustrates a block diagram of a system for dynamic electronic message content in an embodiment. As shown in FIG. 2, system 200 may illustrate a cloud computing environment in which data, applications, services, and other resources are stored and delivered through shared datacenters and appear as a single point of access for the users. The system 200 may also represent any other type of distributed computer network environment in which servers control the storage and distribution of data for different client users. In an embodiment, the system 200 represents a cloud computing system that includes a user computer 202, a first client computer 204, a second client computer 206, a first electronic message service provider 208, a second electronic message service provider 210, a third electronic message service provider 212, and a server 214 that communicate via a network 216. Although FIG. 2 depicts the system 200 with one user computer 202, two client computers 204-206, three electronic message service providers 208-212, one server 214, and one network 216, the system 200 may include any number of user computers 202, any number of client computers 204-206, any number of electronic message service providers 208-212, any number of servers 214, and any number of networks 216.

The server 214 includes an electronic message creator 218 that maps the first electronic message service provider 208 to a first template 220, which may be stored in the first electronic message service provider 208, maps the second electronic message service provider 210 to a second template 222, which may be stored in the second electronic message service provider 210, and maps the third electronic message service provider 212 to a third template 224, which may be stored in the third electronic message service provider 212. The server 214 also includes a database 226, in which the electronic message creator 218 stores dynamic content 228, including electronic message addresses 230.

The user computer 202, which may be part of a mobile computing device, enables a user to communicate with the server 214, and thereby communicate indirectly with the electronic message service providers 208-212 and the client computers 204-206. The electronic message creator 218 can instruct the electronic message service providers 208-212 to provide electronic messages, based on the dynamic content 228, to the client computers 204-206 via the electronic message addresses 230, using the corresponding templates 220-224.

The electronic message creator 218 maps the first electronic message service provider 208 to the first template 220, maps the second electronic message service provider 210 to the second template 222, and maps the third electronic message service provider 212 to the third template 224. The first template 220 is incompatible with the second electronic message service provider 210, the second template 222 is incompatible with the first electronic message service provider 208, the third template 224 is incompatible with the first electronic message service provider 208, and/or the third template 224 is incompatible with the second electronic message service provider 210.

When an application needs to create an electronic message, the application calls upon the electronic message content creator 218 to create the dynamic content 228 for the electronic message. Then, the electronic message creator 218 stores the dynamic content 228 for electronic messages in the database 226, which is accessible by the first electronic message service provider 208, the second electronic message service provider 210, and the third electronic message service provider 212. When the application decides to send unsent electronic messages, the electronic message content creator 218 retrieves the electronic messages from the database 226, then decides which electronic message service provider 208-212 to send the electronic message to. The electronic message creator 218 may instruct the first electronic message service provider 208 to generate a set of electronic messages based on the dynamic content 228, wherein the first electronic message service provider 208 uses the first template 220 to generate the set of electronic messages. The electronic message creator 218 may also instruct the second electronic message service provider 210 to generate a second set of electronic messages based on the dynamic content 228, wherein the second electronic message service provider 210 uses the second template 222 to generate the second set of electronic messages. The electronic message creator 218 may also instruct the third electronic message service provider 212 to generate a third set of electronic messages based on the dynamic content 228, wherein the third electronic message service provider 212 uses the third template 224 to generate the third set of electronic messages.

All of the electronic message service providers 208-212 may easily access and use the dynamic content 228 stored in the database 226 because the dynamic content 228 does not include any of the templates 220-224 that may be incompatible with any of the electronic message service providers 208-212. Again, since the creation of the dynamic content 228 for electronic messages is separate from the generation of the electronic messages based on the dynamic content 228, electronic message generation is an autonomous action that is independent of the available electronic message service providers 208-212. Specification of the templates 220-224 for specific electronic message service providers 208-212 are handled independently of the dynamic content 228 that is created for the electronic messages. The generation of electronic messages becomes more reliable and scalable because this generation is no longer dependent upon any particular electronic message service provider.

System Overview

Figure 3:
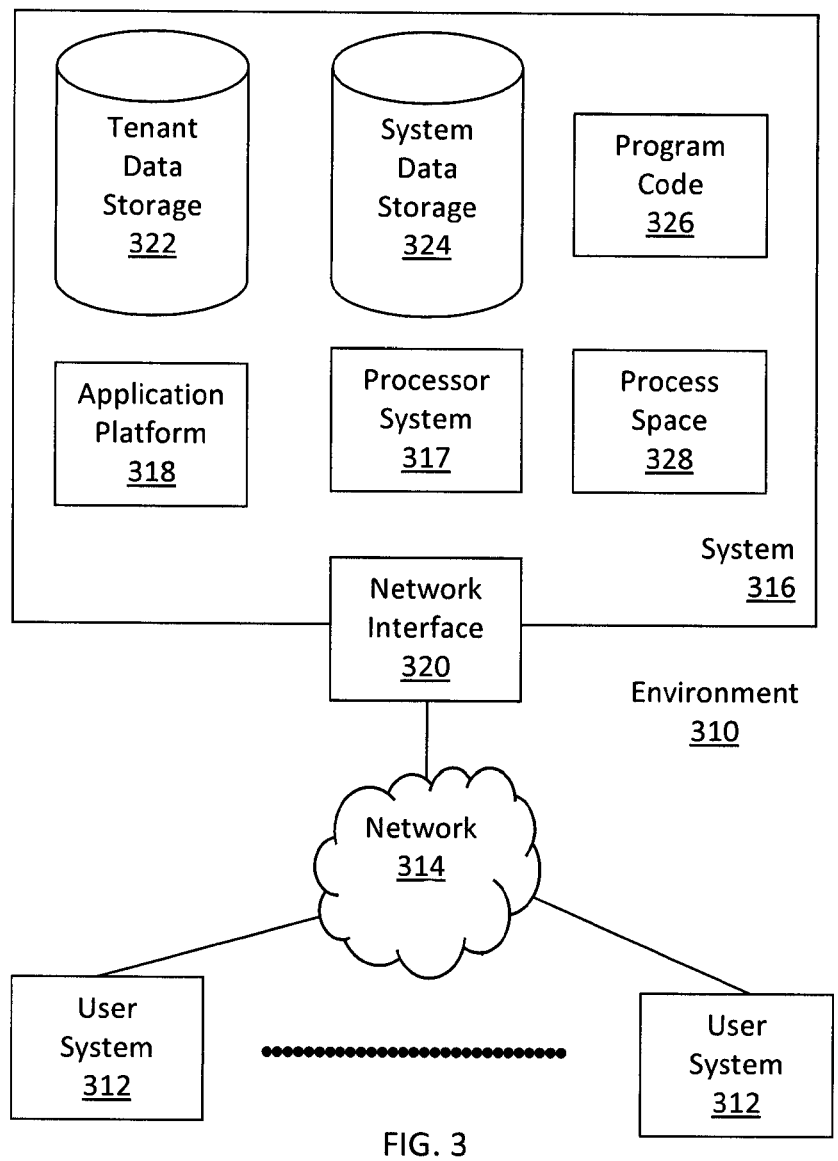
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
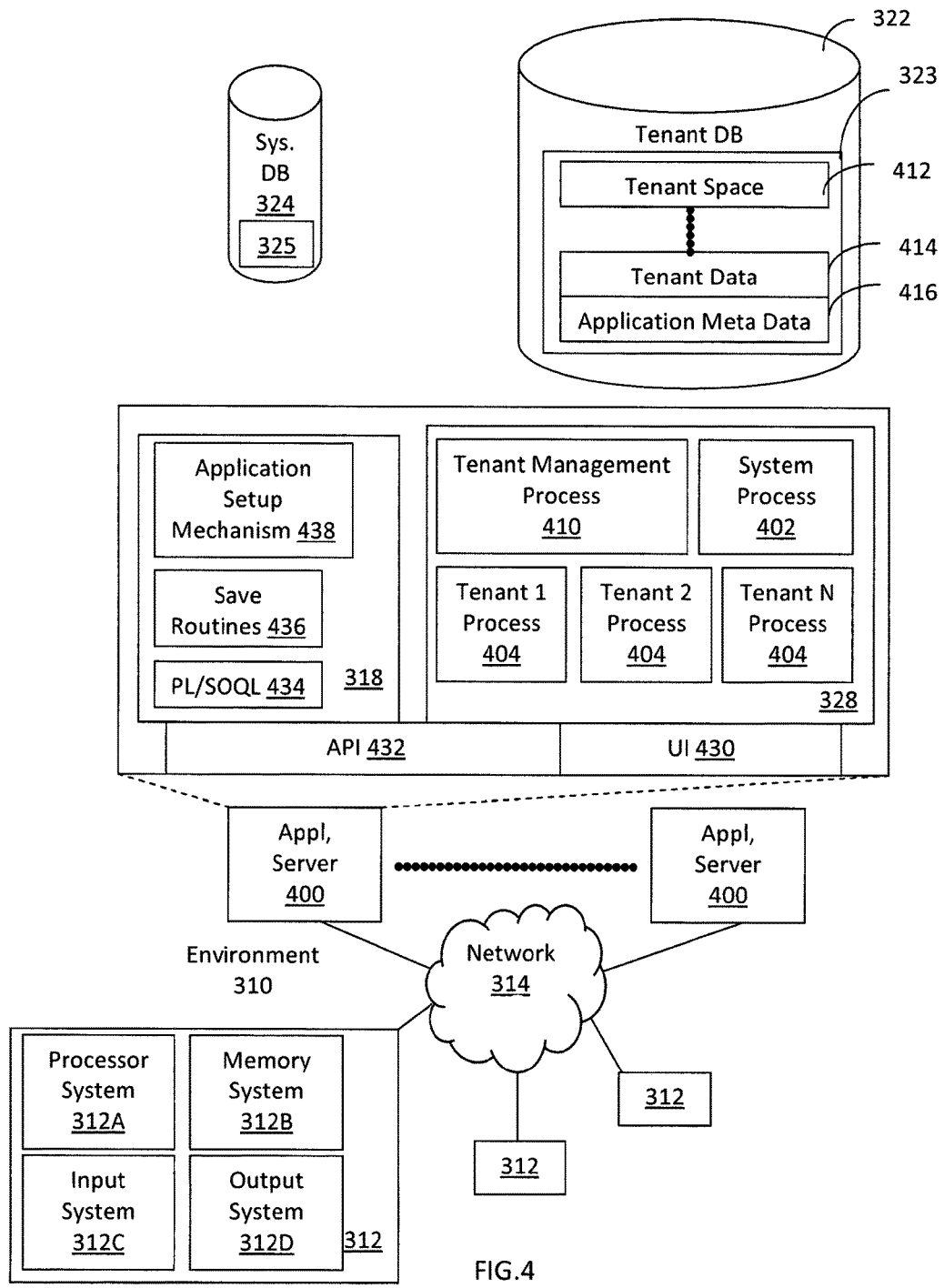
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus comprising:
a processor; and
a non-transitory computer readable medium storing a plurality of instructions, which when executed, cause the one or more processors to:
create a mapping table that maps a plurality of electronic message templates for sending electronic messages to corresponding electronic service providers that enable one-to-many communication, the mapping table including an association between a first template and a first provider of a plurality of electronic message service providers and an association between a second template with a second provider of the plurality of electronic message service providers, the first template being incompatible with the second provider and the second template being incompatible with the first provider;
store dynamic content for electronic messages and the mapping table in a database accessible by the plurality of electronic message service providers, the dynamic content including a plurality of electronic message addresses associated with intended recipients of the electronic messages;
cause the first electronic message service provider to generate a first set of electronic messages directed to a first set of the intended recipients by integrating a first set of the dynamic content into the first template referenced in the mapping table for the first electronic message service provider; and
cause the first electronic message service provider to transmit the first set of electronic messages to the set of intended recipients.

2. The apparatus of claim 1, wherein the plurality of instructions, when executed, further cause the one or more processors to:
cause the second electronic message service provider to generate a second set of electronic messages directed to a second set of the intended recipients by integrating a second set of the dynamic content into the second template referenced in the mapping table for the second electronic message service provider; and
cause the second electronic message service provider to transmit the second set of electronic messages to the second set of intended recipients.

3. The apparatus of claim 1, wherein causing the second electronic message service provider to generate the second set of electronic messages occurs after causing the first electronic message service provider to generate the first set of electronic messages.

4. The apparatus of claim 1, wherein the plurality of instructions, when executed, further cause the one or more processors to:
update the mapping table to include an association between a third template with a third electronic message service provider of the plurality of electronic message service providers, the third template being incompatible with the first electronic message service provider and the second electronic message service provider; and
cause the third electronic message service provider to generate a third set of electronic messages directed to a third set of the intended recipients by integrating a third set of the dynamic content into the third template referenced in the mapping table for the third electronic message service provider; and
cause the third electronic message service provider to transmit the third set of electronic messages to the third set of intended recipients.

5. A non-transitory computer readable storage medium carrying one or more sequences of instructions for dynamic electronic message content, which instructions, when executed by one or more processors, cause the one or more processors to carry out the steps of:
creating a mapping table that maps a plurality of electronic message templates for sending electronic messages to corresponding electronic service providers that enable one-to-many communication, the mapping table including an association between a first template and a first provider of a plurality of electronic message service providers and an association between a second template with a second provider of the plurality of electronic message service providers, the first template being incompatible with the second provider and the second template being incompatible with the first provider;
storing dynamic content for electronic messages and the mapping table in a database accessible by the plurality of electronic message service providers, the dynamic content including a plurality of electronic message addresses associated with intended recipients of the electronic messages;
causing the first electronic message service provider to generate a first set of electronic messages directed to a first set of the intended recipients by integrating a first set of the dynamic content into the first template referenced in the mapping table for the first electronic message service provider; and
causing the first electronic message service provider to transmit the first set of electronic messages to the set of intended recipients.

6. The non-transitory computer readable storage medium of claim 5, further comprising the steps of:
causing the second electronic message service provider to generate a second set of electronic messages directed to a second set of the intended recipients by integrating a second set of the dynamic content into the second template referenced in the mapping table for the second electronic message service provider; and
causing the second electronic message service provider to transmit the second set of electronic messages to the second set of intended recipients.

7. The non-transitory computer readable storage medium of claim 5, wherein causing the second electronic message service provider to generate the second set of electronic messages occurs after causing the first electronic message service provider to generate the first set of electronic messages.

8. The non-transitory computer readable storage medium of claim 5, further comprising the steps of:

updating the mapping table to include an association between a third template with a third electronic message service provider of the plurality of electronic message service providers, the third template being incompatible with the first electronic message service provider and the second electronic message service provider; and causing the third electronic message service provider to generate a third set of electronic messages directed to a third set of the intended recipients by integrating a third set of the dynamic content into the third template referenced in the mapping table for the third electronic message service provider; and causing the third electronic message service provider to transmit the third set of electronic messages to the third set of intended recipients.

9. A method for dynamic electronic message content, the method comprising:

creating a mapping table that maps a plurality of electronic message templates for sending electronic messages to corresponding electronic service providers that enable one-to-many communication, the mapping table including an association between a first template and a first provider of a plurality of electronic message service providers and an association between a second template with a second provider of the plurality of electronic message service providers, the first template being incompatible with the second provider and the second template being incompatible with the first provider;

storing dynamic content for electronic messages and the mapping table in a database accessible by the plurality of electronic message service providers, the dynamic content including a plurality of electronic message addresses associated with intended recipients of the electronic messages;

causing the first electronic message service provider to generate a first set of electronic messages directed to a first set of the intended recipients by integrating a first set of the dynamic content into the first template referenced in the mapping table for the first electronic message service provider; and causing the first electronic message service provider to transmit the first set of electronic messages to the set of intended recipients.

10. The method of claim 9, the method further comprising:

causing the second electronic message service provider to generate a second set of electronic messages directed to a second set of the intended recipients by integrating a second set of the dynamic content into the second template referenced in the mapping table for the second electronic message service provider; and causing the second electronic message service provider to transmit the second set of electronic messages to the second set of intended recipients.

11. The method of claim 9, wherein causing the second electronic message service provider to generate the second set of electronic messages occurs after causing the first electronic message service provider to generate the first set of electronic messages.

12. The method of claim 9, the method further comprising:

updating the mapping table to include an association between a third template with a third electronic message service provider of the plurality of electronic message service providers, the third template being incompatible with the first electronic message service provider and the second electronic message service provider; and causing the third electronic message service provider to generate a third set of electronic messages directed to a third set of the intended recipients by integrating a third set of the dynamic content into the third template referenced in the mapping table for the third electronic message service provider; and causing the third electronic message service provider to transmit the third set of electronic messages to the third set of intended recipients.

13. A method for transmitting code for dynamic electronic message content, the method comprising:

transmitting code to create a mapping table that maps a plurality of electronic message templates for sending electronic messages to corresponding electronic service providers that enable one-to-many communication, the mapping table including an association between a first template and a first provider of a plurality of electronic message service providers and an association between a second template with a second provider of the plurality of electronic message service providers, the first template being incompatible with the second provider and the second template being incompatible with the first provider;

transmitting code to store dynamic content for electronic messages and the mapping table in a database accessible by the plurality of electronic message service providers, the dynamic content including a plurality of electronic message addresses associated with intended recipients of the electronic messages;

transmitting code to cause the first electronic message service provider to generate a first set of electronic messages directed to a first set of the intended recipients by integrating a first set of the dynamic content into the first template referenced in the mapping table for the first electronic message service provider; and transmitting code to cause the first electronic message service provider to transmit the first set of electronic messages to the set of intended recipients.

14. The method for transmitting code of claim 13, the method further comprising:

transmitting code to cause the second electronic message service provider to generate a second set of electronic messages directed to a second set of the intended recipients by integrating a second set of the dynamic content into the second template referenced in the mapping table for the second electronic message service provider; and transmitting code to cause the second electronic message service provider to transmit the second set of electronic messages to the second set of intended recipients.

15. The method for transmitting code of claim 13, wherein transmitting code to cause the second electronic message service provider to generate the second set of electronic messages occurs after transmitting code to cause the first electronic message service provider to generate the first set of electronic messages.

16. The method for transmitting code of claim 13, the method further comprising:

transmitting code to update the mapping table to include an association between a third template with a third electronic message service provider of the plurality of electronic message service providers, the third template being incompatible with the first electronic message service provider and the second electronic message service provider; and transmitting code to cause the third electronic message service provider to generate a third set of electronic messages directed to a third set of the intended recipients by integrating a third set of the dynamic content into the third template referenced in the mapping table for the third electronic message service provider; and transmitting code to cause the third electronic message service provider to transmit the third set of electronic messages to the third set of intended recipients.

* * * * *